United States Patent
Padden et al.

(10) Patent No.: US 11,706,759 B2
(45) Date of Patent: *Jul. 18, 2023

(54) SYSTEMS AND METHODS FOR LATENCY REDUCTION USING MAP STAGGERING

(71) Applicant: CABLE TELEVISION LABORATORIES, INC., Louisville, CO (US)

(72) Inventors: Joseph Padden, Boulder, CO (US); Aaron Quinto, Erie, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 1 day.

This patent is subject to a terminal disclaimer.

(21) Appl. No.: 17/473,572

(22) Filed: Sep. 13, 2021

(65) Prior Publication Data

US 2021/0410167 A1    Dec. 30, 2021

Related U.S. Application Data

(63) Continuation of application No. 16/116,775, filed on Aug. 29, 2018, now Pat. No. 11,122,598.

(Continued)

(51) Int. Cl.
*H04W 24/10*        (2009.01)
*H04W 72/1268*   (2023.01)
(Continued)

(52) U.S. Cl.
CPC ....... *H04W 72/1268* (2013.01); *H04L 47/626* (2013.01); *H04W 72/535* (2023.01); *H04W 80/02* (2013.01)

(58) Field of Classification Search
CPC ........ H04W 72/1268; H04W 72/1257; H04W 80/02; H04W 72/1284; H04L 47/626; H04L 12/413; H04L 47/70; H04L 12/2801; H04L 7/0008; H04B 1/715; H04B 10/25; H04N 21/6168
See application file for complete search history.

(56) References Cited

U.S. PATENT DOCUMENTS 6,956,865 B1 * 10/2005 Khaunte ............. H04L 12/2801
                                                                370/442
7,187,669 B1 *  3/2007 Lee .......................... H04L 12/413
                                                                370/347

(Continued)

FOREIGN PATENT DOCUMENTS

KR    20080036313 A  * 10/2006    ......... H04N 21/2385
KR    20200015752 A  *  6/2018    ........ H04W 72/1284

*Primary Examiner* — Ayaz R Sheikh
*Assistant Examiner* — Louis Samara
(74) *Attorney, Agent, or Firm* — Josh C. Snider

(57) ABSTRACT

A scheduling unit is provided for managing upstream message allocation in a communication network. The scheduling unit includes a processor configured to determine (i) a number of channels communicating in one direction stream of the communication network, and (ii) a MAP interval duration of the communication network. The scheduling unit further includes a media access control (MAC) domain configured to (i) calculate a staggered allocation start time for each separate channel of the number of channels, and (ii) assign a different allocation start time, within the MAP interval duration, to each separate channel.

20 Claims, 5 Drawing Sheets

Related U.S. Application Data

(60) Provisional application No. 62/618,414, filed on Jan. 17, 2018, provisional application No. 62/551,521, filed on Aug. 29, 2017.

(51) Int. Cl.
*H04W 80/02* (2009.01)
*H04L 47/625* (2022.01)
*H04W 72/50* (2023.01)

(56) References Cited

U.S. PATENT DOCUMENTS

| | | | |
|---|---|---|---|
| 2003/0039273 A1* | 2/2003 | Jang | H04L 41/147 370/328 |
| 2005/0003856 A1* | 1/2005 | Jang | H04W 72/121 455/553.1 |
| 2007/0195817 A1* | 8/2007 | Denney | H04N 21/6168 370/468 |
| 2007/0206660 A1* | 9/2007 | Lifchuk | H04B 1/715 375/132 |
| 2008/0170853 A1* | 7/2008 | Rakib | H04L 12/2801 398/26 |
| 2009/0141739 A1* | 6/2009 | Hong | H04L 12/2801 370/468 |
| 2009/0154538 A1* | 6/2009 | Kwon | H04L 5/0044 375/222 |
| 2009/0249417 A1* | 10/2009 | Goguen | H04L 47/70 725/111 |
| 2017/0244539 A1* | 8/2017 | Hanna | H04L 7/0008 |
| 2020/0204257 A1* | 6/2020 | Krampl | H04B 10/25 |

\* cited by examiner

SYSTEMS AND METHODS FOR LATENCY REDUCTION USING MAP STAGGERING

RELATED APPLICATIONS

This application is a continuation of U.S. patent application Ser. No. 16/116,775, filed Aug. 29, 2018. U.S. patent application Ser. No. 16/116,775 claims the benefit of and priority to U.S. Provisional Patent Application Ser. No. 62/551,521, filed Aug. 29, 2017, and to U.S. Provisional Patent Application Ser. No. 62/618,414, filed Jan. 17, 2018. All of these applications are herein incorporated by reference in their entireties.

FIELD

This disclosure relates in general to the field of communications and, more particularly, techniques for reducing latency in cellular backhaul communications.

BACKGROUND

Today's communication systems may include separate wireless and wireline portions, each of which may be owned and controlled by the same or different operators. Present cable network operators, such as Multiple System Operators ("MSOs"), use Data Over Cable Service Interface Specification ("DOCSIS") networks for backhauling Internet traffic, but separate networks, including mobile networks, other DOCSIS networks, Wi-Fi networks, and radio networks have limited to no visibility into parts of the other network types. Each network type, whether DOCSIS or LTE, etc., may have separate traffic scheduling algorithms, and may experience higher latency due to internetwork visibility and communication.

A communication network that implements DOCSIS must manage the upstream communications. DOCSIS upstream scheduling is presently based on a "request-grant approach." In the request-grant approach, a request message is sent from a cable modem (CM) to a cable modem termination system (CMTS). The CMTS prepares a DOCSIS media access control (MAC) management message (MMM), called the MAP, and inserts an entry into the MAP indicating a grant for the CM. The grant entry in the MAP message contains an upstream service identifier (SID) associated with a service flow assigned to the CM, a transmission time signaled as a mini-slot number, and the number of bytes to be transmitted. The CMTS transmits the MAP to the CM, so that the CM can make use of the grant to send its upstream data to the CMTS.

In the upstream direction, a conventional DOCSIS communication network may, for example, include a Wi-Fi device (not shown), which communicates MAP messages through a gateway (e.g., a modem, not shown) over a wireless communication pathway (not shown), using an 802.11ac wireless communication protocol to an upstream modem termination system (MTS, not shown).

In operation, a DOCSIS network may experience latency in the upstream traffic as a result of several conditions, including (i) queuing delays, which result from transfer control protocol (TCP) flows sending traffic faster than the link rate of the network, and (ii) request-grant delays, which constitute the time needed to fulfill the request-grant approach, that is, the "request-grant time." There are many factors that determine the request-grant time in DOCSIS. The DOCSIS specification contains a detailed analysis of the request-grant delay 0. For DOCSIS, the minimum delay is generally every second MAP time interval, plus some circuit and queuing delay. In DOCSIS 3.0, the typical CMTS uses a 2 ms MAP time interval, but in some cases, the CMTS has been known to exhibit a 5 ms minimum request-grant response time 0.

For upstream scheduling, the typical CMTS uses a scheduling algorithm that may significantly impact the length of the request-grant delay. For example, if the CMTS is using a best effort (BE) scheduling algorithm, some requests made in a contention slot will fail on their first attempt. One solution to this problem has been for the CMTS to use a real-time polling service (rtPS) scheduling algorithm, which places the request in a dedicated slot to ensure successful requests. However, BE scheduling algorithms achieve better performance than rtPS scheduling algorithms in the case where DOCSIS is idle, since the idle state will leave many request contention slots available. Accordingly, BE algorithms provide lower latency than rtPS algorithms in idle states, but for busy systems, rtPS algorithms achieve lower net latency than BE algorithms, due to the fact that the BE algorithm is required to repeat requests often, whereas the rtPS is able to provide guaranteed latency.

In some communication systems, requests may also be sent as a piggyback message with a data packet. Such piggybacking techniques are deterministic within a flow, and avoid contention. For lightly loaded systems and frequency division duplexing (FDD) for long term evolution (LTE), DOCSIS 3.0 has a minimum request-grant delay of approximately 5 ms, while 4G LTE has a minimum request-grant delay of about 18-24 ms without re-transmission, and 26-34 ms with one hybrid automatic repeat request (HARM) retransmission. These latency values will increase under higher loads or if time division duplexing (TDD) is used in LTE.

The DOCSIS request-grant loop delay has many contributing factors that lead to having an upstream latency longer than required by many applications, such as require small cell backhaul, for example. Fundamental components of the request-grant delay in DOCSIS include (i) MAP generation time (100-200 μs), (ii) MAP-advance time (100 μs-20 ms), (iii) MAP interval (1 ms-6 ms or greater), and (iv) grant servicing time allowed to the CM (650 μs). Where an upstream transmission constitutes a single upstream channel, the request-grant delay is approximately equal to the sum of these four fundamental components, under loaded conditions, e.g., when the CMTS is forced to insert contention request periods. At present, in the case of multiple upstream channel configurations, approximately the same request-grant delay calculation applies, because the MAP intervals are aligned (in time) across the active upstream channels, as illustrated below with respect to FIG. 1.

FIG. 1 is a timing diagram illustrating a conventional distribution 100 of MAP messages 102 for four upstream channels 104 in a communication system (not separately shown) implementing DOCSIS. In this example, distribution 100 includes a MAP interval 106 of 2 ms. In typical operation of a conventional DOCSIS communication system, the CMTS scheduler operates over a 2 ms MAP interval (i.e., MAP interval 106), and gives each service flow of channels 104 only one grant for each MAP interval 106. Accordingly, this operation results in the nominal 2 ms interval between grants for messages 102 on each upstream channel 104. In the example illustrated in FIG. 1, each downward arrow represents a particular MAP message 102 being sent from the CMTS for a particular channel 104.

In conventional multi-channel DOCSIS networks, transmission of individual MAP messages 102 from a particular channel 104 are aligned in time to coincide with the transmission of MAP messages 102 from other channels 104, as illustrated in FIG. 1. That is, conventional DOCSIS networks align the MAP intervals across bonded upstream channels 104, such that the allocation start time of a particular MAP interval 106 is approximately the same (i.e., within a few μs) for all four channels 104. As illustrated below with respect to FIG. 2, this conventional interval alignment results in unnecessarily latency in the case of simultaneous grant requests from different channels 104.

FIG. 2 is a sequence diagram illustrating a conventional transmission opportunity grant effect 200 according to conventional distribution 100, FIG. 1. Effect 200 is illustrated with respect to MAP interval 106, FIG. 1, which includes a first component 202, a second component 204, and a third component 206. In this example, first component 202 represents the next MAP fulfillable time (e.g., 0.6 ms), second component 204 represents the MAP generation time (e.g., 0.2 ms), and third component 206 represents the MAP time for advance and contention request region (e.g., 1.2 ms).

In operation of effect 200, the alignment of allocation times for all channels 104 creates a global allocation start time 208 within a domain 210 of the MAC layer (not shown in FIG. 2) for each upstream (US) transmission 212 to wait for the single MAP interval 106. More particularly, because MAC domain 210 of conventional transmission opportunity grant effect 200 applies global allocation start time 208 for all upstream transmissions 212, a window 214 in which requests may be fulfilled in the next MAP interval 106' (i.e., for the lowest latency opportunity) is only a fraction of MAP interval 106 (approximately the first 25% of MAP interval 106, approximately corresponding to just short of the completion of first component 202, i.e., less than the first 0.6 ms of the 2 ms MAP interval 106). In the case of piggybacking, window 214 indicates the amount of time to make the piggyback request just before cutoff.

In this conventional scheme, a minimum value 216 for the request-grant loop delay is the sum of the MAP generation time (i.e., second component 204, e.g., 0.2 ms) plus the MAP advance time (i.e., third component 206, e.g., 1.2 ms), or 1.4 ms in this example. Under this scheme, a maximum value 218 for the request-grant loop delay therefore effectively becomes the sum of minimum value 216 (e.g., 1.4 ms), plus the length of 1 MAP interval (e.g., 2 ms), or 3.4 ms in this example. Maximum value 218 is illustrated in FIG. 2 with respect to EXAMPLE 1, which demonstrates a granted transmission opportunity (TxOP) 220(1) only after expiration of two full MAP intervals 106, e.g., at 4 ms. Similarly, minimum value 216 is illustrated in FIG. 2 with respect to EXAMPLE 2, which demonstrates a granted TxOP 220(2) only after expiration of the first MAP interval 106, e.g., at 2 ms.

SUMMARY OF THE INVENTION

In an embodiment, a scheduling unit is provided for managing upstream message allocation in a communication network. The scheduling unit includes a processor configured to determine (i) a number of channels communicating in one direction stream of the communication network, and (ii) a MAP interval duration of the communication network. The scheduling unit further includes a media access control (MAC) domain configured to (i) calculate a staggered allocation start time for each separate channel of the number of channels, and (ii) assign a different allocation start time, within the MAP interval duration, to each separate channel.

In an embodiment, a method of scheduling upstream data traffic over a communication network is provided. The method includes steps of determining a MAP interval duration according to a communication protocol of the communication network, counting a number of upstream transmission channels in the communication network, dividing the MAP interval duration by the number of upstream transmission channels, calculating an allocation start time interval based on the step of dividing, and assigning each of the number of upstream transmission channels a different allocation start time within the MAP interval duration.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
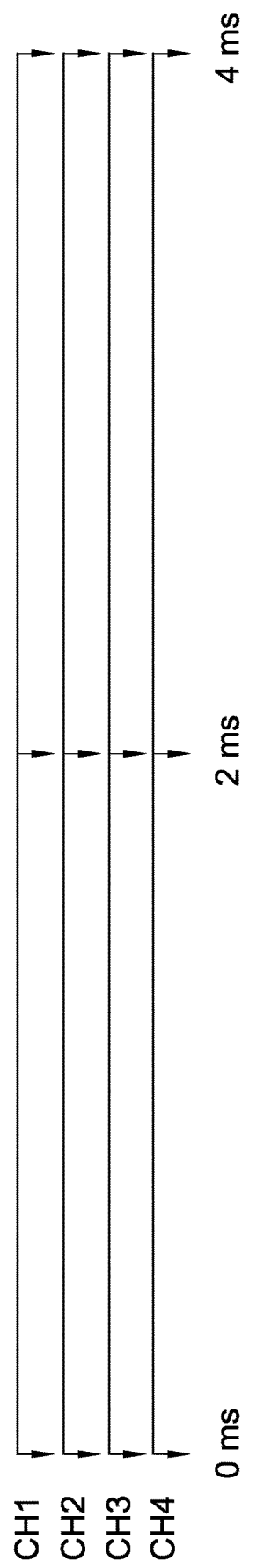
FIG. 1 is a timing diagram illustrating a conventional distribution of MAP messages for four upstream channels in a communication system implementing DOCSIS.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged;

such ranges are identified and include all the sub-ranges contained therein unless context or language indicates otherwise.

The systems and methods described below provide latency reduction techniques that are advantageous for communication systems implementing DOCSIS, and also for other communication systems that schedule MAP messages. The present embodiments are described with respect to upstream MAP scheduling, but may also be implemented in some downstream scheduling circumstances. The present MAP staggering techniques improve over conventional MAP alignment schemes by significantly reducing the maximum request-grant loop latency between upstream channel transmissions.

In an exemplary embodiment, an upstream scheduling unit staggers MAP interval allocation start times for different upstream channels according to a duration of the MAP interval, divided by the number of upstream channels at issue, such that the "effective map interval" may be reduced, but without sacrificing the beneficial attributes (e.g., lower overhead, less segmentation, other efficiency improvements, etc.) of the existing, longer MAP interval. That is, the present latency reduction techniques are particularly effective in the case where multiple upstream channels are in use. By staggering the start time of the MAP interval for each upstream channel in use, the request-grant loop delay for upstream transmissions is effectively, and significantly, reduced in the aggregate of multiple channels.

Figure 3:
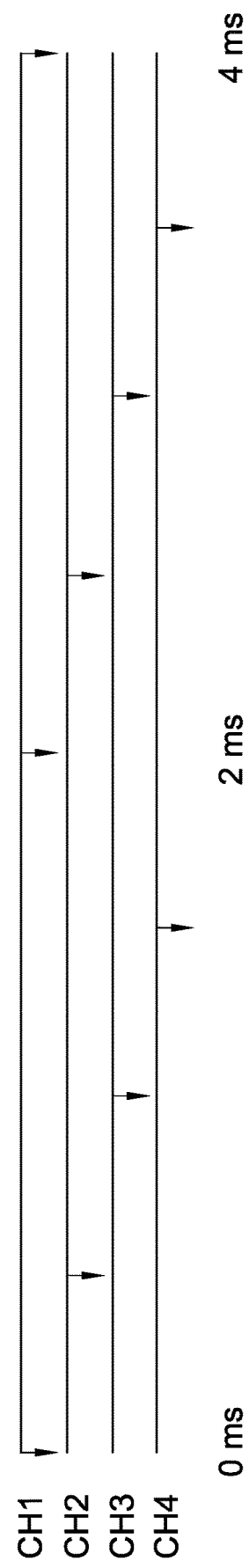
FIG. 3 is a timing diagram illustrating an exemplary staggered distribution of MAP messages for four upstream channels in a communication system implementing DOC SIS, in accordance with an embodiment.

FIG. 3 is a timing diagram illustrating an exemplary staggered distribution 300 of MAP messages 302 for four upstream channels 304 in a communication system (not separately shown) implementing DOCSIS, and using a standard-duration MAP interval 306 (e.g., 2 ms). Staggered distribution 300 is similar to conventional distribution 100, FIG. 1, with respect to the respective individual components thereof (i.e., MAP messages, channels, MAP interval), but significantly differs from the conventional approach with respect to the staggered allocation of MAP messages 302. More particularly, in the exemplary embodiment, staggered distribution 300 improves over conventional distribution 100 by distributing MAP messages 302 at substantially evenly-spaced intervals within the same 2 ms window of MAP interval 306.

In exemplary operation, an upstream scheduler (e.g., at the MTS or CMTS, not shown) of the DOCSIS communication system still operates to give each service flow of channels 304 only one grant for each MAP interval 306, similar to the conventional scheme. However, according to staggered distribution 300, respective allocation start times of MAP interval 306 differ for each upstream channel, but all such allocation start times nevertheless occur within the boundaries of a single (i.e. the first) MAP interval 306.

For example, as illustrated in FIG. 3, MAP message 302(1) denotes the allocation start time of MAP interval 306(1) for channel 304(1) (i.e., CH1), and the respective allocation start times for channels 304(2) (i.e., CH2), 304(3) (i.e., CH3), and 304(4) (i.e., CH4) all occur before the expiration of MAP interval 306(1), and before the commencement of next MAP interval 306(1)'. In the exemplary embodiment the respective allocation start times of channels 304 are distributed substantially evenly across the duration of the first MAP interval (e.g., MAP interval 306(1)). In this example, for four channels 304 over a 2 ms MAP interval 306, the respective allocation start times are staggered according to a formula based on the MAP interval duration divided by the number of channels, or 2 ms/4 channels=0.5 ms per channel. More specifically, in this example, MAP message 302(1) starts at 0 ms, MAP message 302(2) starts at 0.5 ms, MAP message 302(3) starts at 1 ms, and MAP message 302(4) starts at 1.5 ms, leaving an equal duration of time (e.g., 0.5 ms) between the start of MAP message 302(4) and commencement of next MAP interval 306(1)'.

Accordingly, in this exemplary embodiment, with four upstream channels 304 all using 2 ms MAP intervals, the "effective MAP interval" is actually 0.5 ms (500 μs), which effectively reduces the upstream latency for distribution 300 by as much as 1.5 ms. In some cases, it is noted that, even according to this innovative distribution scheme, particular components of the request-grant loop may not be further reduced (e.g., MAP generation time and MAP servicing time, described further below with respect to FIG. 4). Nevertheless, in the aggregate, the cumulative effect of staggering the allocation start times of the channels 304 evenly within a single MAP interval 306 (i.e., by managing the MAP advance time) enables this dramatic reduction to the effective MAP interval across the upstream transmission.

Figure 2:
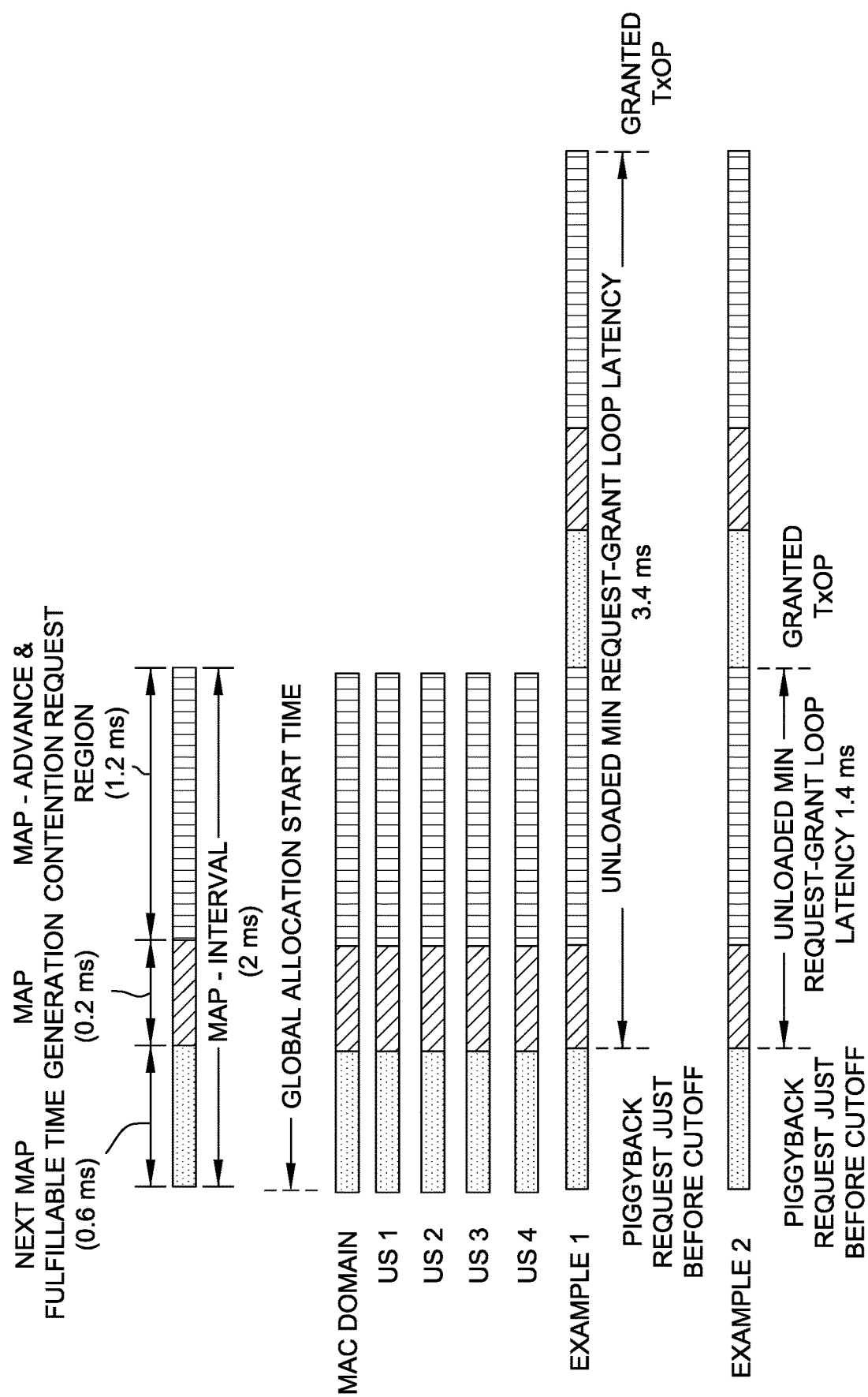
FIG. 2 is a sequence diagram illustrating a conventional transmission opportunity grant effect according to the conventional distribution of MAP messages depicted in FIG. 1.
Figure 4:
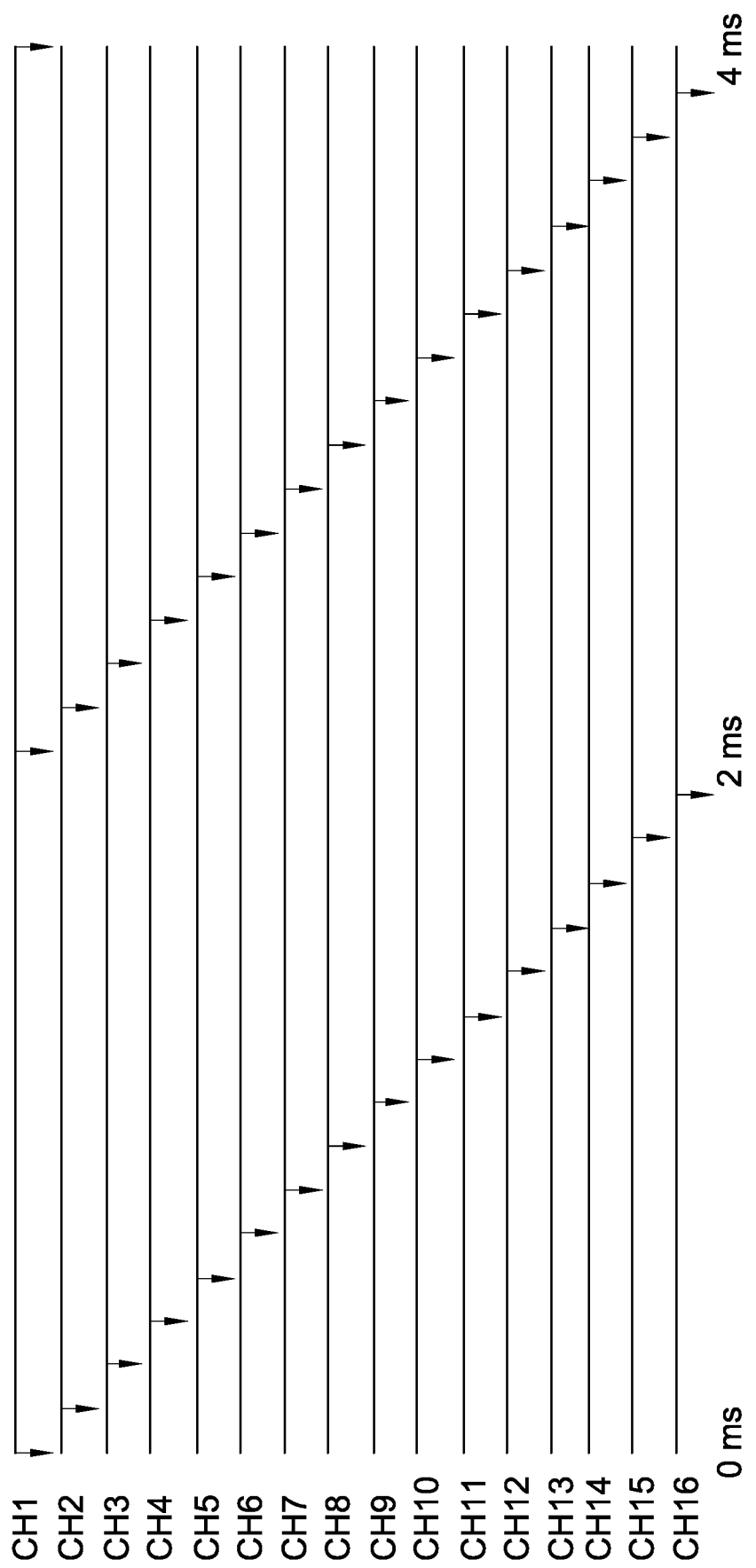
FIG. 4 is a sequence diagram illustrating an exemplary transmission opportunity grant effect according to the staggered distribution of MAP messages depicted in FIG. 3.

FIG. 4 is a sequence diagram illustrating an exemplary transmission opportunity grant effect 400 according to staggered distribution 300, FIG. 3. Similar to conventional transmission opportunity grant effect 200, FIG. 2, effect 400 is illustrated with respect to MAP interval 306(1) (i.e., the first MAP interval 306), FIG. 3, which includes a first component 402 (e.g., representing the 0.6 ms next MAP fulfillable time), a second component 404 (e.g., representing the 0.2 ms MAP generation time), and a third component 406 (e.g., representing the 1.2 ms MAP advance time).

In operation of effect 400, a staggered allocation start time for a weight is calculated within a MAC domain 410 (not shown in FIG. 4) for each upstream (US) transmission 412 based on first MAP interval 306(1), according to the formula described above. In the exemplary embodiment, because each of upstream transmissions 412 is a staggered, a fulfillment window 414 for the next MAP interval 306(1)' is determined only according to first upstream transmission 412(1). The significance of this difference from conventional effect 200 is illustrated in FIG. 4 with respect to the depicted comparisons between EXAMPLE 1 and EXAMPLE 2.

That is, according to effect 400, a minimum value 416 for the request-grant loop delay is still the sum of the MAP generation time (i.e., second component 404, e.g., 0.2 ms) plus the MAP advance time (i.e., third component 406, e.g., 1.2 ms), or 1.4 ms. In other words, the minimum unloaded request-grant loop does not change from the conventional technique. However, in contrast to conventional effect 200, according to an exemplary embodiment of effect 400, a maximum value 418 for the request-grant loop delay is reduced to the effective MAP interval, which is the duration (e.g., 2 ms) of MAP interval 306 itself. In other words, maximum value 418 of effect 400 is reduced by 1.4 ms from maximum value 218 of conventional effect 200, which represents a reduction by over 41% to the unloaded request-grant loop delay.

This latency reduction can be seen to further produce dramatic savings with respect to a granted TxOP 420 as well. As illustrated with respect to EXAMPLE 1, a first TxOP 420(1) (i.e., corresponding to first upstream transmission 412(1)) is approximately the same as that granted in effect 200, namely, after expiration of the first MAP interval 106, e.g., at 2 ms. However, as illustrated with respect to EXAMPLE 2, granted TxOP 420(2) (i.e., corresponding to second upstream transmission 412(2)) occurs is significantly sooner namely, at approximately 2.5 ms. As illustrated below with respect to FIG. 5, as the count of upstream channels increases, maximum value 418 approach is the sum of the MAP generation time (e.g., second component 404) plus the MAP advance time (e.g., third component 406, or minimum value 416).

Figure 5:
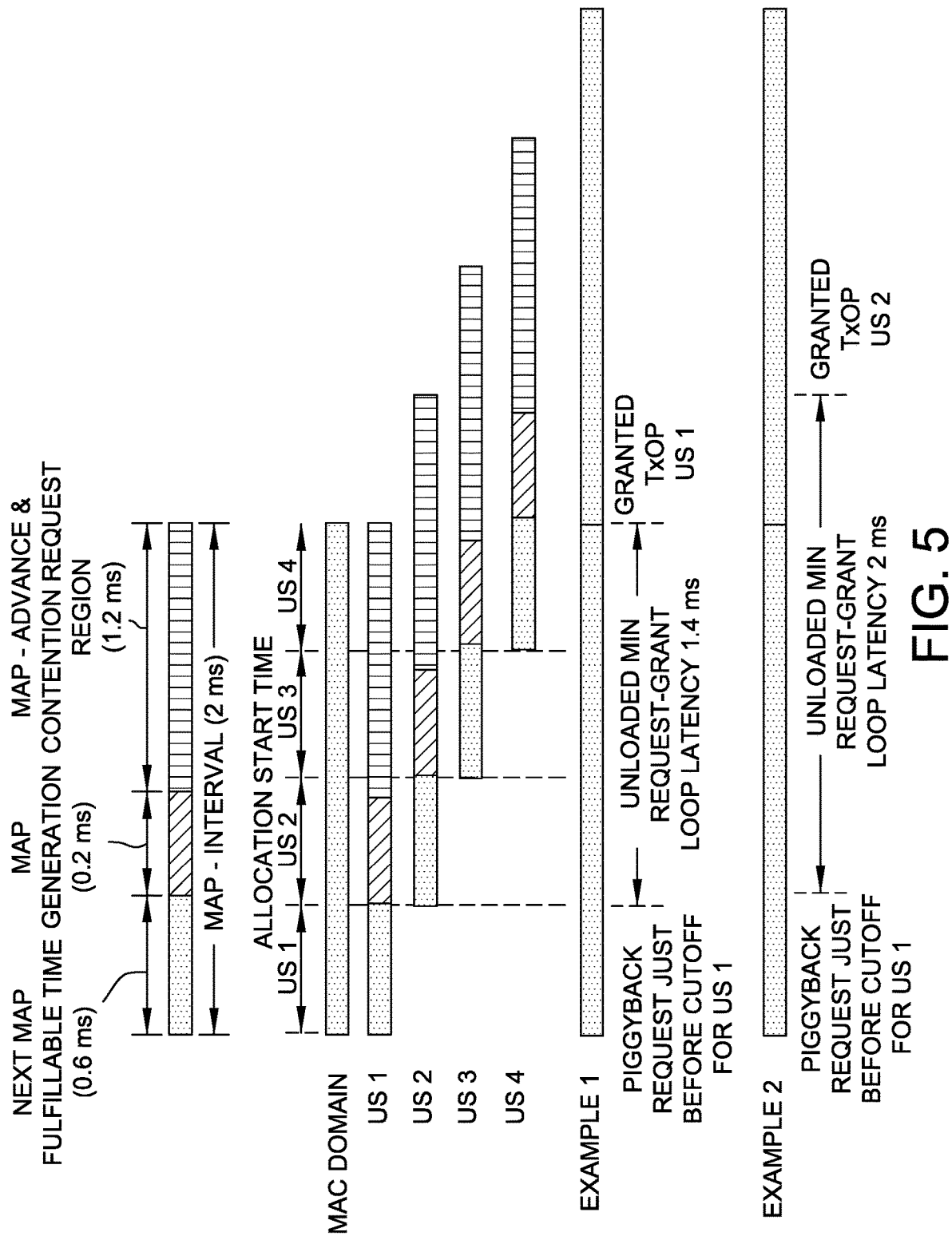
FIG. 5 is a timing diagram illustrating an exemplary staggered distribution of MAP messages for sixteen upstream channels in a communication system implementing DOC SIS, in accordance with an embodiment.

FIG. 5 is a timing diagram illustrating an exemplary distribution 500 of MAP messages 502 for sixteen upstream channels 504 in a communication system implementing DOCSIS. Staggered distribution 500 is similar to staggered distribution 300, FIG. 3, except that staggered distribution 500 includes four times as many upstream channels 504 over a same single MAP interval 506 (e.g., 2 ms). Distribution 500 otherwise operates similarly to distribution 300, except for the calculation of the stagger duration applied to each successive upstream channel 504. In this example, the respective allocation start times are staggered according to substantially the same formula (i.e., MAP interval duration divided by the number of channels), or 2 ms/16 channels=0.125 ms per channel 504. Therefore, according to the exemplary embodiment, various MAP messages 502 may appear to a client device every 125 microseconds.

Accordingly, the present embodiments significantly improve the ability to unlock the cellular backhaul market, which is traditionally almost entirely reliant on the lower DOCSIS latency. Therefore, the systems and methods provide a useful new tool for lower DOCSIS 3.0 latency, which may, in some instances, be provided with a software update (e.g., to the MTS/CMTS), and thereby enable dramatic latency reductions without altering existing hardware or architectures. In addition to reducing latency, the present systems and methods further advantageously reduce the jitter experienced by best effort (BE) flows.

The systems and methods described above may be advantageously implemented with respect to conventional DOCSIS communication network architectures. Such network architectures typically include an application infrastructure along an upstream communication link to cable network (not shown), and may implement, without limitation, protocols for Software Defined Networking (SDN)/Network Functions Virtualization (NFV) Application Development Platform and OpenStack project (SNAPS). Implementation of SNAPS is particularly useful in association with the NFV infrastructure, as well as Virtualization Infrastructure Managers (VIM) that presently utilized DOCSIS and DOCSIS 3.1, which enable deployment of end-to-end applications.

Additionally, network virtualization provides a software simulation of a hardware platform, and functionality is separated from the hardware to run as a "virtual instance." Network virtualization further enables the capability to create, modify, move, and terminate functions across the network in a stable, repeatable, and cost-effective platform. SNAPS additionally provides transparent application programming interfaces (APIs) for the various infrastructures, and reduces complexity of integration testing. The present embodiments are therefore further applicable to an application infrastructure that utilizes a virtual Converged Cable Access Platform (CCAP) core to control a cable plant and move packets to and from a client device to the customer sites. The present embodiments are of thus particularly advantageous to reduce latency while optimizing the backhaul operation.

The embodiments described above are generally discussed with respect to a conventional cable network, for ease of explanation, but not in a limiting sense. The present systems and methods, for example, are also applicable to optical networks, which may, be formed with an Optical Network Terminal (ONT) or an Optical Line Termination (OLT), and an Optical Network Unit (ONU), and which may utilize optical protocols such as EPON, RFOG, or GPON.

Other embodiments that are contemplated include communication systems capable of x-hauling traffic, as well as satellite operator communication systems, Wi-Fi networks, MIMO communication systems, microwave communication systems, short and long haul coherent optic systems, etc. X-hauling is defined herein as any one of or a combination of front-hauling, backhauling, and mid-hauling.

In these additional embodiments, above references to the "MTS" may be considered as generally interchangeable with the corresponding termination units of the optical or other networks, such as the ONT, the OLT, a Network Termination Unit, a Satellite Termination Unit, and/or other termination systems collectively referred to as "Modem Termination Systems (MTS)." Similarly, references to the "modem" may be considered a generally interchangeable, within the scope of the present embodiments, with such devices or units including a satellite modem, the ONU, a DSL unit, etc., which are collectively referred to as "modems." Furthermore, although the DOCSIS protocol as described specifically above, the innovative MAP allocation techniques of the present embodiments are also applicable to other protocols where message allocation can influence latency, including EPON, RFoG, GPON, Satellite Internet Protocol, without departing from the scope of the embodiments herein.

Accordingly, in an exemplary embodiment, the upstream scheduler may be implemented in, or associated with, the modem. That is, the modem manages (e.g., using an upstream scheduling unit or upstream scheduling software module) the upstream traffic according to the low latency techniques described herein, and sends the managed upstream traffic over a communication link to the MTS. In other embodiments, the upstream scheduler may be implemented in, or associated with, the MTS. In some embodiments, the communication link between the modem and the MTS is a wireless communication pathway (not shown), which may utilize an 802.11ad+ communication protocol.

According to the embodiments described herein, a more realistic approach is provided to reduce latency for DOCSIS networks. Such additional latency reductions are achieved according to the implementation of an innovative upstream scheduling technique that implements a staggered allocation approach.

Additionally, although the embodiments herein are described primarily with respect to upstream traffic, the scheduling techniques may also be advantageously implemented for some downstream traffic situations. In such cases, the scheduling unit (hardware or software-based) may be more optimally located within the operational control of the MTS. Although upstream traffic often includes different considerations than would the downstream traffic (e.g., upstream traffic is often considered more "bursty"), downstream traffic nevertheless also experiences latency problems, which may be improved according to the present techniques.

Individual modems that support recent DOCSIS versions (e.g., D3.1) can be field-upgraded to implement the present systems and methods by way of a software update from the operator. Other modems may be upgraded by hardware modifications. Present systems and methods are advantageously applicable in cooperation with routers provided by either the operator or the customer. Accordingly, the techniques described herein are operable to reduce median latency for all traffic, but with no impact to TCP bulk data throughput. The present systems and methods require no additional configuration from the operator, but may flexibly be configured to provide operator control. The low latency DOCSIS techniques of the present embodiments are also applicable to LTE small cell backhaul in a DOCSIS environment Exemplary embodiments of systems and methods for low latency upstream traffic management and scheduling are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized with respect to downstream traffic, and in connection with other medication networks utilizing DOCSIS protocols or similarly compatible protocols.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

We claim:

1. A scheduling unit for managing upstream message allocation in a communication network, comprising:
   a processor configured to determine (i) a number of channels communicating in one direction stream of the communication network, and (ii) a grant interval duration of the communication network; and
   a media access control (MAC) domain configured to (i) calculate a staggered allocation start time for each separate channel of the number of channels, and (ii) assign a different allocation start time, within the grant interval duration, to each separate channel,
   wherein the grant interval duration comprises a first component indicating a next grant fulfillable time, a second component indicating a grant generation duration, and a third component indicating a grant advance duration,
   wherein the communication network is configured according to a request-grant approach for transmissions in one direction stream,
   wherein the request-grant approach includes a first request-grant loop latency and a second request-grant loop latency greater than the first request-grant loop latency,
   wherein the first request-grant loop latency is based upon a sum of the second component and the third component, and
   wherein the second request-grant loop latency is substantially equal to the grant interval duration.

2. The scheduling unit of claim 1, wherein the processor is further configured to grant a transmission opportunity based upon a sum of the second request-grant loop latency and at least one staggered allocation start time interval.

3. The scheduling unit of claim 2, wherein the first request-grant loop latency represents a minimum request-grant loop latency value of the communication network.

4. The scheduling unit of claim 2, wherein the second request-grant loop latency represents a maximum request-grant loop latency value of the communication network.

5. The scheduling unit of claim 1, wherein the MAC domain is configured to calculate the staggered allocation start time based on the grant interval duration divided by the number of channels.

6. The scheduling unit of claim 1, comprising a modem.

7. The scheduling unit of claim 6, wherein the modem comprises one or more of a cable modem, a satellite modem, an optical network unit, and a DSL unit.

8. The scheduling unit of claim 1, comprising a modem termination system (MTS).

9. The scheduling unit of claim 8, wherein the MTS comprises one or more of a cable modem termination system, an optical network terminal, an optical line termination, a network termination unit, and a satellite termination unit.

10. The scheduling unit of claim 1, wherein the communication network is configured according to at least one of a data over cable service interface specification (DOCSIS), a 802.11 wireless communication protocol, and a transfer control protocol.

11. The scheduling unit of claim 10, wherein the grant interval duration is a MAP interval duration.

12. The scheduling unit of claim 1, wherein the one direction stream comprises an upstream transmission flow.

13. A method of scheduling upstream data traffic over a communication network, comprising the steps of:
   determining a downstream grant interval duration according to a communication protocol of the communication network;
   counting a number of upstream transmission channels in the communication network;
   dividing the downstream grant interval duration by the number of upstream transmission channels;
   calculating an allocation start time interval based on the step of dividing; and assigning each of the number of upstream transmission channels a different allocation start time within the downstream grant interval duration.

14. The method claim 13, wherein the communication protocol is a data over cable service interface specification (DOCSIS) protocol.

15. The method claim 13, executed by one of a modem and a modem termination system (MTS).

16. The method claim 13, wherein the downstream grant interval duration includes a first component indicating a next grant fulfillable time, a second component indicating a grant generation duration, and a third component indicating a grant advance duration.

17. The method claim 16, further comprising granting a first transmission opportunity at a first allocation start time and a second transmission opportunity at a second allocation start time different than the first allocation start time.

18. The method claim 17, wherein the first allocation start time is based upon a sum of the second component and the third component.

19. The method claim 18, wherein the second allocation start time is based upon a sum of the first component and the downstream grant interval duration.

20. The method of claim 13, wherein the downstream grant interval duration is a MAP interval duration.

* * * * *